Dec. 10, 1968     S. R. CASEY, JR., ET AL     3,415,068
SUBMARINE DEVICE
Filed April 18, 1966
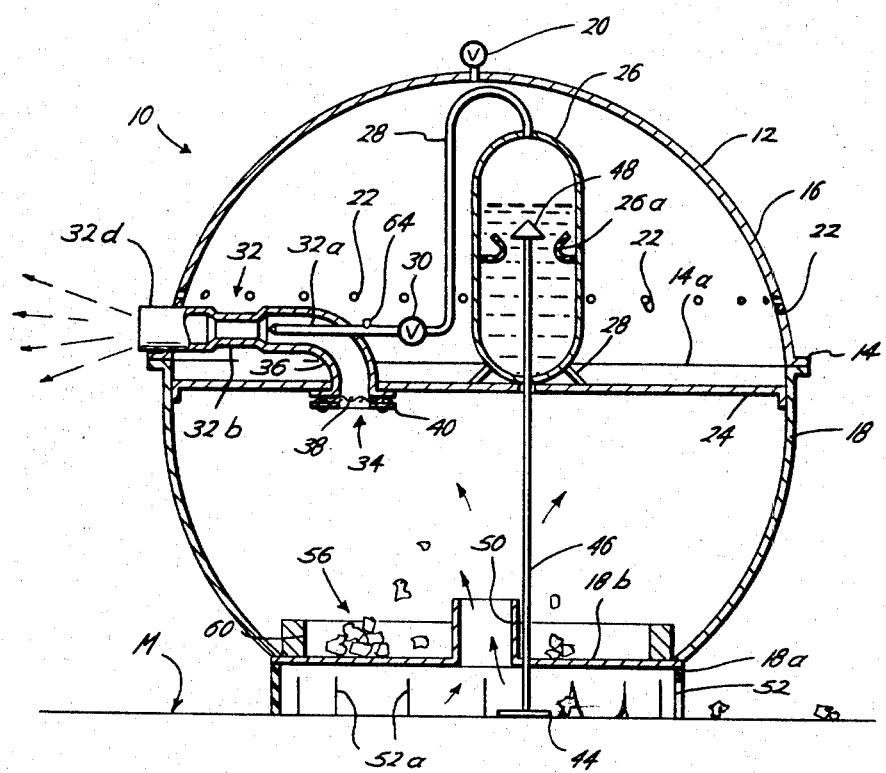
Sam R. Casey, Jr.
William L. Eddleman, Sr.
INVENTORS
BY Hayden & Pravel
ATTORNEYS

United States Patent Office 3,415,068
Patented Dec. 10, 1968

3,415,068
SUBMARINE DEVICE
Sam R. Casey, Jr., 2233 Troon Road 77019, and William L. Eddleman, Sr., 2810 Prescott 77025, both of Houston, Tex.
Filed Apr. 18, 1966, Ser. No. 543,164
9 Claims. (Cl. 61—69)

ABSTRACT OF THE DISCLOSURE

In submarine device, apparatus preferably including a body adapted to be flooded to sink to the bottom of a body of water; means responsive to arrival thereat to agitate the bottom and collect benthonic materials therefrom with a compartment during lateral movement on the bottom; means for generating a gas accumulated therein to obtain positive bouyancy and initiating a rise to the surface; said submarine device being non-rigid and constructed with a yieldable structure subjected to pressure variations without consequence and without crushing or failure.

---

This invention relates to a new and surprising submarine device able to travel to maximum ocean depths and return therefrom.

An object of this invention is to make available a nonrigid structure including a body portion which responds to hydrostatic pressure balance to permit the structure to travel to the greatest possible maximum ocean depths and return therefrom without harm or damage.

An additional object of the present invention is to provide a new and improved submarine device which dives to ocean depths to obtain and return a specimen from the ocean bottom structure.

Another object of the present invention is to provide a new and improved submarine device drawing water thereinto in turbulent flow as an aid to gather and collect material from the ocean floor for retrieval to the surface.

One use of the present invention is to provide a method of mining native metals found on the ocean floor by agitating material at the ocean floor to draw the native metals into a container for retrieval to the surface of the ocean.

One object of the present invention is to provide a new and improved method of mining in which a vessel is sunk to the ocean floor, the floor is agitated to inflow loose material into the vessel, and a gas is allowed to accumulate within the vessel to make the vessel buoyant to return same to the surface.

A related object of the present invention is to provide a new and improved device using a gas generator which propels the device with the intake thereof agitating the ocean floor to gather material, and a selected portion of gas is accumulated within a body having a closed upper end to make the vessel again buoyant for a return trip to the surface of the ocean.

Other objects and advantages of the present invention will become readily apparent from a consideration of the following description and drawing wherein the drawing illustrates one form of the present invention in sectional view as comprising a nonrigid structure for collecting samples from the ocean floor.

Attention is directed to the drawing of the present invention which shows in sectional view the submarine device which is indicated generally at 10. The submarine device includes a preferably spherical chamber 12 which may be in the form of a true sphere formed into hemispheres which are joined together at the flanged intersection 14. The upper hemisphere is indicated at 16, and the lower hemisphere is indicated at 18. The sphere 12 is believed to be a convenient shape of structure of manufacture and, as such, provides no particular function other than to enclose the structure of the present invention. Moreover, the shape may be altered to other shapes as desired and may be also changed in scale to any desired larger or smaller structure for the present invention.

The submarine device of the present invention provides a structure which can be carried to a desired spot on the surface of the ocean and there released to permit same to sink to the ocean depths and to rest on the floor material at the bottom of the body of water. To this end, it is preferable to provide the structure of the present invention in the form of a semirigid structure such as that formed by plastic construction or the like. Moreover, the use of the present invention with plastic structural materials provides a structure somewhat yieldable to the hydrostatic pressure so that a hydrostatic pressure balance is acheived during operation of the present invention to permit same to travel to the greatest ocean depths without any concern for the absolute ocean pressures acting thereon. Thus, the material comprising the structure of the present invention need only be sufficiently strong to co-operate with the structure and not deform, crystallize, or otherwise be detrimentally harmed by the action of the high pressure found at great ocean depths.

Returning again to the drawing, attention is directed to the fact that a valve 20 is located centrally of the hemisphere 16 and provides a means of bleeding the structure of the present invention of air. As previously noted, the submarine device 10 of the present invention is carried by a vessel to some spot on the ocean surface and is there permitted to sink to the bottom material beneath the surface. Since the upper hemisphere 16 provides something of a closed chamber, the valve 20 is installed in the present invention to permit the air to be bled from within the submarine device 10 to accomplish full flooding thereof to permit the device to sink. It will be appreciated that full flooding of the device then enables the structure to sink at a rate related to the excess of the density of the structure 10 over the density of water which assumed to be unity in the conventional case. The upper hemisphere 16 is thus prevented from trapping an air bubble which would defeat negative buoyancy or which would also tend to subject part of the structure of the upper hemisphere 16 to a hydrostatic pressure unbalance during the descent of the vessel.

The upper and lower hemispheres 16 and 18, respectively, are joined together at the flanged intersection 14. While no joinder means is indicated in the drawing, those skilled in the art will appreciate that the two hemispheres may be joined together by means such as nuts and bolts and the like. Moreover, it is not necessary that the flanged intersection 14 be on a true diameter of the sphere, but rather the actual division of the sphere 12 into separable segments 16 and 18 is subject to some variation and is shown in the drawing as providing a dividing line 14a which extends fully around the sphere 12 and which divides same into two unequal portions as shown in the drawing. This is a matter of design, and the number of segments used in forming the sphere 12 is subject to some variation.

A plurality of bleed holes 22 is arranged about the circumference of the upper segment 16. It will be appreciated that the bleed holes serve to limit the extent to which trapped gases in the upper portions of the sphere 12 extend downwardly in the sphere. At any event, the bleed holes 22 provide a means maintaining hydrostatic equilibrium of the vessel 12 for the return trip as will be described in greater detail.

The lower hemisphere portion 18 carries a centrally located dividing member 24 which extends fully thereacross, also serving as a means of structural reinforcing. The support member 24 carries certain apparatus as will be described. In the first instance, a tank 26 is supported by a plurality of legs 28 extending from the support member 24 to position the tank 26 within the hemisphere 16. The tank 26 is adapted to contain a fuel as will be described in greater detail. The upper portion of the tank 26 supports a conductor 28 which communicates with a valve 30 which then imparts the escaping fluids from the tank 26 to venturi means indicated generally at 32. The venturi structure 32 is provided in the present invention to accommodate lateral movement of the invention once it reaches the ocean floor. The venturi means utilizes escaping fluids from the tank 26 to generate a force acting laterally of the structure 12 of the present invention and moves the body 12 at a desired rate on the ocean floor as will be described.

Attention is directed to several details of the venturi structure 32 wherein an intake means is indicated generally at 34. The intake means 34 includes an elbow pipe 36 which extends through an opening in the support member 24 and provides a screened intake 38. The intake 38 is preferably in the form of a wire screen or the like which is joined to the elbow pipe 36 by means of a conventional clamp ring 40 which is bolted to the elbow member 36. The screen member 38 is provided to prevent sand, granules, and other material above a certain size from passing through the venturi and possibly doing harm to the venturi and also to prevent the loss of native metals as will be appreciated. The valve 30 which is a pressure regulation valve of some known variety communicates with a delivery tube 32a centered in the venturi structure 32. The venturi means includes the restricted portion 32b downstream from the nozzle or outlet of the delivery tube 32a and provides an outlet jet at the outlet member 32d which is located exteriorly of the sphere 12 proper. It will be noted that the venturi utilizes the moving fluid escaping through the nozzle 32a to draw liquid through the port means 34 for exhaustion through the outlet nozzle 32d whereupon a reaction force is formed by the venturi which urges the structure 10 of the present invention to the right when viewed in the drawing. Thus, it will be appreciated that the means 32 provides means for imparting lateral motion to the device of the present invention.

Little has yet been said about the propellant fuel of the present invention, but attention is directed to the interior of the storage tank 26 for an understanding of the propellant. In the tank 26, a diaphragm 26a is indicated and is shown in a ruptured condition indicating initiation of the fuel generating process in the present invention. Opening of the diaphragm 26a is achieved by utilization of means triggered on contact of the submarine device 10 of the present invention with the bottom M beneath the body of water. More particularly, a bottom engaging foot 44 is suspended on a vertically extending, slidable rod member 46 wherein the contact of the foot 44 against the bottom material M slidingly moves the rod 46 upwardly relative to the structure of the submarine device 10. The rod 46 passes through an opening in the support member 24 and is sealingly engaged through a suitable packing means at the lower portions of the storage tank 26 to extend thereinto without leakage. The upper end of the rod 46 carries a point 48 which is adapted to penetrate the diaphragm 26a. It should be noted that in the descending condition, the point 48 is of a larger diameter than the openings permitting the rod 46 to extend into the tank 26 and, therefore, is limited in downward movement relative to the structure of the submarine device 10 of the present invention. Therefore, as the device settles towards the bottom M and the foot 44 is contacted thereagainst, the point is moved from its quiescent condition resting at the bottom of the tank 26 upwardly towards the diaphragm 26a to penetrate and puncture same.

The diaphragm 26a is used to separate liquid fuels. It is desired in the present invention to utilize liquid fuels which are stored on opposite sides of the diaphragm as a means of generating a gas for causing movement in operation of the present invention. More particularly, the liquid fuels need only generate the gas on commingling, and the actual chemistry of the fuel propellants is not critical. However, by way of example and not limitation, one suitable fuel combination includes the use of a liquid acid such as acetic acid placed on one side of the diaphragm 26a and a liquid carbonate placed on the other side. It will be appreciated that the mingling of the liquid acid and the carbonate liberates carbon dioxide in quantity. The liberation of the carbon dioxide drives the gas through the pipe 28 and through the valve 30 into the venturi to cause operation of the device of the present invention. It should be noted that the only limitation existing on the gas is that the gas be essentially nonsoluble in water, although small traces of carbon dioxide are usually absorbed by water, and even this small quantity is not a particular detriment to the present invention.

The fuel system of the present invention is subject to variation. For instance, as opposed to using a pair of separated constituent fuels in the tank 26, it may be desirable to place "Dry Ice" in the tank 26 wrapped in an insulating material which is sealed against the water and yet which is yieldable in response to the high pressures found at the great submerged depths. If such a structure were used, then the trigger means previously described would properly puncture or tear the insulating wrapper or container about the "Dry Ice" to expose water to the Dry Ice. It will be appreciated that the heat transfer characteristics of water are more than adequate to cause the Dry Ice to surrender heat very rapidly to the great expanses of ocean water and therefore sublime from the solid state to the gaseous state and thereby generate a generous quantity of gas. The present invention makes use of the valve 30 to smooth out the surges or irregularities in the flow of gas wherein a regulated flow controls the lateral movement of the device.

It should be noted that the structure of the fuel system including the tank 26 and the pipe 28 is adapted to withstand extreme hydrostatic pressures at any depth. This is because the device is preferably arranged with liquid in all of the tank 26 and the pipe 28 to prevent the structural loading resulting from high pressure water on one side of the structure and only highly compressible gas on the other side. Since the device was previously described as including a semirigid structure in the tank 26, those skilled in the art will appreciate that the semirigid structure yields sufficiently to provide a hydrostatic pressure balance acting thereon such that the entirety of the apparatus is able to respond to the extreme pressures at ocean depths.

It should be noted that the gas generator of the present invention serves two purposes. In the first instance, the flow of the gas through the venturi and the consequential drawing of liquid into the venturi provide a lateral movement to the submarine device 10 of the present invention. It has been previously described as generating a reaction force such that the sphere 12 is moved to the right when viewing the drawing. Moreover, the second function is achieved wherein the collection and accumulation of samples of material taken from the bottom M of the body of water is achieved. For this purpose, attention is directed to the flow of liquid into the venturi structure 32 as will be described.

The lower hemisphere 18 is truncated at 18a and provided with a lower partition member 18b which extends fully thereacross. Centrally or interiorly of the floor 18b is provided an intake member 50. The intake member 50 includes an upstanding draw pipe which extends from the floor member 18b and upwardly into the interior of the hemispherical volume defined by the structure 18. The hemispherical volume is adapted to receive and store material collected from the bottom M. The material M lies beneath the body of water in the form of dust, sand, granules, and even larger particles of the native metals. It will be appreciated that the exact mixture of materials located at the bottom is subject to some variation, but, within the scope of the present invention, the device provides a means for agitating the material M and collecting the desired ores within the submarine device 10 of the present invention. Specifically, the truncated structure indicated at 18a carries a skirt member 52 which is a yieldable rubber skirt or similar device for somewhat defining and sealing off the area in which the intake of liquid through the draw pipe 50 is achieved. The skirt 52 preferably includes splits 52a or other vertical openings extending from the lower edge to permit the various portions of the skirt to flex and bend independently of one another. The various portions between the splits 52a are adapted to flap and agitate the material on the bottom M as the skirt contacts the bottom M during movement of the structure laterally thereacross. Thus, considering only one portion between the splits 52a, the exemplary portion yields and opens to admit a large rock, piece of ore, or other substantial material interiorly of the skirt member 52 for exposure to the agitating flow of water. As previously noted, the venturi means 32 draws a substantial quantity of water therethrough, and the water flows through the upstanding intake means 50. Such flow of liquid is directed along the route above described, and since the bottom material is usually loose and somewhat granular, it will be appreciated that extensive agitation carries loose material interiorly of the skirt 52 towards the upstanding intake pipe 50.

It will be noted that the upstanding intake pipe 50 extends above the floor 18b carried in the hemisphere 18. This permits accumulation of loose particles as generally indicated at 56 within the interior of the hemisphere 18. The loose particles 56 are the native metals accumulated from the bottom material M and can total a substantial pay load within the submarine device 10 of the present invention. Economic feasibility of the present invention is achieved by accumulating a substantial quantity of material 56 within the bottom structure, and to this end, the entirety of the volume provided between the floor member 18b and the structural support member 24 is made available for such accumulation. However, it will be appreciated that the layout of the structure including the upstanding pipe 50 and the location of the water intake member 34 is subject to some variation. For instance, it may be desirable to accumulate only the large particles indicated generally at 56 within the structure of the submarine device 10, and to this end, it may be desired to quickly pass small particles such as sand through the venturi 32 and out of the device. The arrangement of the upstanding pipe to extend closer to the water intake member 34 is sufficient to direct the flow of water such that the sand particles which are more easily suspended in the water flow are carried through the screen 34 while the screen 34 and the effects of gravity tend to settle out the heavier particles more rapidly. It will be appreciated that such design is subject to variation, and it is, therefore, within the purview of those skilled in the art.

The device of the present invention is maintained in the upright position shown in the drawing by inclusion of the weight member 60 which is shown carried on the lower portions of the hemispherical portion 18. The weight member 60 is calculated to maintain the device in the upright position as it settles towards the bottom. On the other hand, return of the device of the present invention to the surface is achieved by utilization of a bleed port 64 located on the tubing material communicating with the fuel tank 26 and the venturi structure 32. The port 64 is a slight opening which permits gas to bleed from the venturi means and to bubble upwardly within the hemisphere 16. It will be appreciated that the very high hydrostatic pressure located at great ocean depths is sufficient to compress the gas into very, very small bubbles of almost microscopic size. However, it will be further appreciated that the continued accumulation of bubbles of gas at the upper portions of the hemisphere is sufficient to eventually alter the buoyancy of the present invention. Thus, the gas is accumulated as the device of the present invention moves laterally across the floor, and the net result of the operation of the present invention is to exhaust the fuel carried in the tank 26 at about the time that the buoyancy of the device becomes positive and therefore lifts the device of the present invention from the floor M of the body of water and to return same to the surface. It should be further observed that the structure of the present invention which exposes the gas bubbles to hydrostatic pressure from the nether side of the accumulated bubble of gas within the hemisphere 16, is such that the structure itself is not strained, but rather, the gas is compressed to maintain the hydrostatic pressure balance. Further, the accumulation of gas to provide the positive buoyancy is limited by the bleed holes 22 previously described. The gas compressed to a very small volume within the sphere of the present invention at great ocean depths is permitted to expand and expands within the sphere of the present invention to drive water therefrom. To prevent the gas from expanding into the lower portions of the sphere 12, the bleed ports 22 are provided at a predetermined vertical location on the structure 12 to exhaust the gas at that level. Thus, it will be appreciated that the gas never extends to a point below the level of the ports 22, and the bleed ports 22 leak off the gas into the body of water. Control of the center of gravity relative to the center of buoyancy maintains the vertical orientation of the device as it ascends towards the ocean surface. Obviously, means may be provided to prevent re-entry of water into the upper portions of the sphere 12.

It should be noted that the present invention provides a method of retrieving materials in benthonic areas beneath the body of water. The method uniquely comprises the steps of sinking the container from the surface to the bottom of the body of water. Moreover, the method encompasses the placing of a portion of the bottom material within the container means on arrival of the container means at the bottom. As implied from the step of sinking the container to the bottom of the body of water, it will be appreciated that such is achieved by normally altering the buoyancy to provide a structure which is fully flooded and which sinks as previously described. However, it is desired to further alter the buoyancy of the container after arrival at the bottom to obtain a positive buoyancy after retrieving and receiving the portions of the bottom material therein such that the positive buoyancy lifts the container from the bottom and returns same towards the ocean surface. It will be noted that the return is essentially untethered and may be best described as free fall movement. Moreover, the method of the present invention is adapted to accumulate the material located at the ocean bottom within the container. For instance, it may be desirable to retrieve native metals for their economic value. On the other hand, it may be desirable in various scientific endeavors in the broad scope of oceanography to accumulate samples and the like by the use of the present invention. The method of the present invention enables retrieval without the regard to the depth of the ocean of the body of water.

The foregoing disclosure and description of the invention are illustrative and explanatory thereof, and various changes in the size, shape, and materials as well as in the details of the illustrated construction may be made within

What is claimed is:
1. A submarine device for use in a body of water, comprising:
  (a) a body adapted to be flooded with water and having sufficient density to sink indefinitely and without limit until reaching the bottom of a body of water of any depth when flooded;
  (b) first means carried by said body for obtaining a portion of materials from benthonic areas at the bottom of the body of water in which the device is placed;
  (c) container means carried by said body and adapted to receive the portion of the benthonic materials from said first means to store same for subsequent retreival at the surface of the body of water; and
  (d) means carried by said body at least partially responsive to arrival of said body at the bottom of the body of water for lifting said body through the body of water toward the surface.
2. The invention of claim 1 including a nonrigid structure comprising said body, said structure including a buoyancy chamber adapted to contain a gas therein to float said body toward the surface of the water.
3. The invention of claim 1 including a valve for discharging gas from the buoyancy chamber to assist in sinking said body in the body of water.
4. The invention of claim 1 including:
  (a) water intake means;
  (b) water moving means for drawing water through said intake means and for agitating the bottom of the body of water to stir up sand, dust, and other particles on the bottom; and
  (c) said water intake means being in communication with said container means for moving water bearing sand, dust, and other particles relative to said container means to store same therein.
5. The invention of claim 1 including a gas generator in said retrieving means for generating a gas to change the buoyancy of said body.
6. The invention of claim 1 including a gas generator associated with said self-contained means for generating a gas, and means for using gas from said generator to agitate the bottom of the body of water.
7. The invention of claim 1 including a gas generator for causing lateral movement of said body.
8. The invention of claim 1 including a gas generator, and means initiating operation of said generator when said body sinks to the bottom of the body of water.
9. The invention of claim 1 wherein said container means includes an inlet and means for preventing the portion of the bottom for escaping from said container means.

References Cited
UNITED STATES PATENTS

| | | | |
|---|---|---|---|
| 687,830 | 12/1901 | Kirk | 37—56 |
| 1,490,157 | 4/1924 | Cherniak | 9—324 |
| 2,848,972 | 8/1958 | Orzynski | 115—11 |
| 3,171,376 | 3/1965 | Sellner et al. | 61—69 X |

DAVID J. WILLIAMOWSKY, *Primary Examiner.*

J. K. BELL, *Assistant Examiner.*

U.S. Cl. X.R.

115—11; 37—56